May 8, 1923.

A. MATISSE ET AL 1,454,755

REFLECTOR

Filed May 20, 1922

WITNESSES
William P. Goebel.
E. W. Savage

INVENTOR
Albert Matisse
Carl A. Matisse
BY
ATTORNEYS

Patented May 8, 1923.

1,454,755

UNITED STATES PATENT OFFICE.

ALBERT MATISSE AND CARL A. MATISSE, OF NEW YORK, N. Y.

REFLECTOR.

Application filed May 20, 1922. Serial No. 562,549.

*To all whom it may concern:*

Be it known that we, ALBERT MATISSE and CARL A. MATISSE, both citizens of the United States, and residents of the city of New York, borough of Manhattan, in the county and State of New York, have invented new and useful Improvements in Reflectors, of which the following is a full, clear, and exact description.

This invention relates to reflectors.

For many purposes it has been found desirable to produce a yellow ray. This yellow ray has great penetrating properties and is of value for headlights and the like. Considerable difficulty has been experienced in producing at a low cost a reflector which throws a yellow ray.

The general object of this invention is the provision of a cheap and efficient reflector for throwing a yellow ray.

This object is accomplished by providing a yellow glass and applying to one face of the yellow glass a reflecting composition comprising a gold salt and superimposing upon the gold salt other salts and metals which serve to increase its strength and stability.

This and other objects of the invention will be more clearly understood from the following detailed description which refers to the accompanying drawings.

Figure 1:
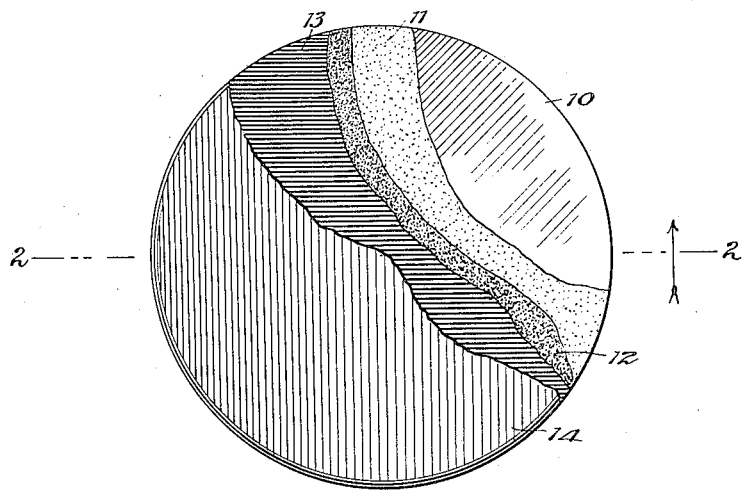
Figure 2:
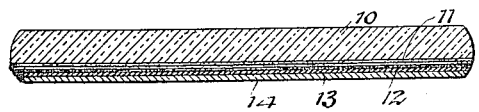

Figure 1 is a back plan view of the reflector with portions of the various layers forming the reflecting back broken away; and Figure 2 is a section along the line 2—2, Figure 1.

In the preparation of the glass for this reflector approximately 54.94 per cent silica, 13.74 per cent minium, 13.74 per cent carbonate of potash, 2.20 per cent niter, 8.24 per cent carbonate of lime, 4.94 per cent borax and 2.20 per cent oxide of cadmium are mixed together and heated in a furnace. The furnace is of any of the usual types used in the process of making glass. During the heating process care must be taken to eliminate all the gases so that the glass obtained will be clear and without bubbles. A glass formed from this mixture by careful treatment has a yellow tint, a property due to the oxide of cadmium. The carbonate of potash and the carbonate of lime assist in the melting and the binding while the nitre gives off oxygen which assists in the elimination of the gases and helps to clarify the liquid, giving a more perfect glass. Minium is used in this process of making glass since it adds to the transparency of the glass.

After the glass 10 for the reflector has been formed by the above-mentioned process and cast or otherwise formed into the desired shape, a reflecting back is applied to the proper surface. This reflecting back is built up from a coating of gold chloride 11 applied to the glass of the reflector. The coating of gold chloride is usually applied to the reflector by dipping the reflector in a solution of gold chloride. Then two coatings of silver nitrate 12 are superimposed upon the layer of gold chloride. The irregular surface of the silver nitrate is covered over by applying a layer of copper 13 through an electroplating process. The application of the layer of copper 13 firmly establishes the layer of gold chloride and the layers of silver nitrate in position on the glass. Applied to the copper is a layer of bakelite 14 forming a protector.

This gives a reflector which consists of a glass, which has the property of yellow fluorescence, and a reflecting back applied in conjunction therewith. This reflecting back, which has the layer of gold chloride adjacent the glass, throws only yellow rays, the remainder of the rays being absorbed.

We would state in conclusion that while the illustrated example constitutes a practical embodiment of our invention we do not limit ourselves strictly to the exact details herein illustrated since manifestly the same can be considerably varied without departing from the spirit of the invention as defined in the appended claims.

Claims:

1. A reflector of the class described formed by preparing glass from approximately 54.94 per cent silica, 13.74 per cent minium, 13.74 per cent carbonate of potash, 2.20 per cent niter, 8.24 per cent carbonate of lime, 4.94 per cent borax, and 2.20 per cent oxide of cadmium, and applying to one face of the glass one coat of chloride of gold, two coats of silver nitrate, and by a process of electroplating one coating of copper and a protecting layer over the copper.

2. A reflector of the class described comprising a yellow glass, and a reflecting back for reflecting a yellow ray applied to one face of the glass, comprising a coating of a gold salt, a silver salt superimposed on the gold salt, a layer of copper applied to the silver salt by an electroplating process, and a protecting layer applied to the copper.

3. As a new article of manufacture, a reflector of the class described, comprising a yellow glass made of approximately 54.94 per cent silica, 13.74 per cent minium, 13.74 per cent carbonate of potash, 2.20 per cent niter, 8.24 per cent carbonate of lime, 4.94 per cent borax, and 2.20 per cent oxide of cadmium, a reflecting back applied to one face of said yellow glass comprising a coating of chloride of gold, two coatings of nitrate of silver, a layer of copper applied by electroplating process, and a protecting layer of bakelite applied in any ordinary manner.

4. As a new article of manufacture, a reflector of the class described, comprising a yellow glass made from silica, minium, carbonate of potash, niter, carbonate of lime, borax, oxide of cadmium, and a reflecting back for reflecting a yellow ray applied to said yellow glass comprising a gold salt, a silver salt, a metal applied by electroplating process, and a protector applied to the metal.

ALBERT MATISSE.
CARL A. MATISSE.